United States Patent
Choi et al.

(10) Patent No.: US 11,594,964 B2
(45) Date of Patent: Feb. 28, 2023

(54) DC-DC CONVERTER OUTPUT REGULATION SYSTEMS AND METHODS

(71) Applicant: SYNAPTICS INCORPORATED, San Jose, CA (US)

(72) Inventors: Jae Won Choi, Irvine, CA (US); Dan Shen, Irvine, CA (US); Balakishan Challa, Irvine, CA (US); Lorenzo Crespi, Irvine, CA (US); Ketankumar B. Patel, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 17/109,087

(22) Filed: Dec. 1, 2020

(65) Prior Publication Data

US 2022/0173659 A1    Jun. 2, 2022

(51) Int. Cl.
*H02M 3/157* (2006.01)
*H02M 1/00* (2006.01)

(52) U.S. Cl.
CPC .......... *H02M 3/157* (2013.01); *H02M 1/0012* (2021.05); *H02M 1/0019* (2021.05)

(58) Field of Classification Search
CPC ................. H02M 1/0012; H02M 3/155–1588
See application file for complete search history.

(56) References Cited

U.S. PATENT DOCUMENTS

| | | | |
|---|---|---|---|
| 6,055,168 A | 4/2000 | Kotowski et al. | |
| 6,169,673 B1 | 1/2001 | McIntyre et al. | |
| 6,693,808 B2 | 2/2004 | Myono | |
| 6,753,623 B2 | 6/2004 | McIntyre et al. | |
| 6,987,787 B1 * | 1/2006 | Mick | H05B 45/14 372/38.07 |
| 7,342,389 B1 | 3/2008 | Wu et al. | |
| 8,797,770 B2 | 8/2014 | Conta et al. | |
| 9,906,122 B2 | 2/2018 | Crespi et al. | |

(Continued)

FOREIGN PATENT DOCUMENTS

CN          101167238 A  *  4/2008  ............ H02M 3/156

OTHER PUBLICATIONS

Bayer, Erich et al., "Change Pump With Active Cycle Regulation—Closing the Gap Between Linear- and Skip Modes", dated 2000 IEEE, pp. 1497-1502.

(Continued)

*Primary Examiner* — Peter M Novak
(74) *Attorney, Agent, or Firm* — Paradice & Li LLP

(57) ABSTRACT

A circuit includes a controller circuit configured to receive an output voltage of a converter and adjust a switching frequency of the converter in response to a status of an output load and an output load sensing circuit configured to determine the status of the output load and provide the peak current to the controller circuit. The output load sensing circuit may include a first timer configured to provide a delayed first signal to a peak current control in response to the output load being a heavy load. A second timer may be configured to provide a delayed second signal to the peak current control in response to the output load being a light load. The peak current control may be configured to adjust a peak current based on the received first signal and the second signal and configured to provide the peak current to the controller circuit.

20 Claims, 8 Drawing Sheets

(56) References Cited

U.S. PATENT DOCUMENTS

| | | |
|---|---|---|
| 10,084,369 B2 | 9/2018 | Shen et al. |
| 2011/0133963 A1 | 6/2011 | Kawai |
| 2012/0250381 A1 | 10/2012 | Takahashi |
| 2012/0268086 A1 | 10/2012 | Chou et al. |
| 2013/0141071 A1 | 6/2013 | Conta et al. |
| 2013/0294125 A1 | 11/2013 | Chen |
| 2014/0002043 A1 | 1/2014 | Li et al. |
| 2014/0117955 A1 | 5/2014 | Zoso |
| 2014/0225583 A1 | 8/2014 | Huang |
| 2015/0280590 A1 | 10/2015 | Maede |
| 2016/0276932 A1* | 9/2016 | Pullen .................. H02M 1/088 |
| 2016/0301303 A1 | 10/2016 | Bari |
| 2017/0168515 A1 | 6/2017 | Beck |
| 2018/0032096 A1 | 2/2018 | Beck |
| 2018/0175730 A1* | 6/2018 | Leong .................. H02M 3/158 |
| 2019/0157974 A1* | 5/2019 | Tomita .................. H02M 1/08 |
| 2021/0211047 A1* | 7/2021 | Zhao .................. H02M 1/0041 |

OTHER PUBLICATIONS

Ma Mengzhe, "Design of High Efficiency Step-Down Switched Capacitor DC/DC Converter", A Thesis Submitted to Oregon State University, dated May 21, 2003, 6 pages.

\* cited by examiner

DC-DC CONVERTER OUTPUT REGULATION SYSTEMS AND METHODS

TECHNICAL FIELD

The present application generally relates to DC-DC converters, and more particularly, for example, to systems and methods for adaptive peak current control in a DC-DC converter.

BACKGROUND

Power converters such as DC-DC converters are used to power many electronic devices. The amount of load drawn by these electronic devices can vary from device to device. Some electronic devices may be a light load that does not draw much current whereas other electronic devices may be a heavy load that draws substantially more current from the DC-DC converter. Additionally, the load may vary within the same device or between interconnected devices based on usage and mode. As the load varies, the output of the DC-DC converter may produce voltage ripples or interferences that may negatively impact device performance. In view of the foregoing, there is a continued need for improvements in DC-DC converters to reduce these and other negative effects.

SUMMARY

The present disclosure describes improved DC-DC converters, including improved systems and methods for regulating the output of DC-DC converters. According to an embodiment of the present disclosure, a circuit is described. The circuit may include a controller circuit configured to receive an output voltage of the converter and adjust a switching frequency of the converter in response to a status of an output load. An output load sensing circuit is configured to determine the status of the output load and provide the peak current to the controller circuit, wherein the output load sensing circuit includes a first timer configured to provide a delayed first signal to a peak current control in response to the output load being a heavy load, a second timer configured to provide a delayed second signal to the peak current control in response to the output load being a light load, and the peak current control configured to adjust a peak current based on the received first signal and the second signal, and configured to provide the peak current to the controller circuit.

According to another embodiment of the present disclosure, a method is described. The method may include measuring a timing between a first switching cycle of a converter and a second switching cycle of the converter, determining whether the second switching cycle occurs before expiration of a first predetermined time, and incrementing a peak current control in response to determining the second switching cycle occurring before the expiration of the first predetermined time.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
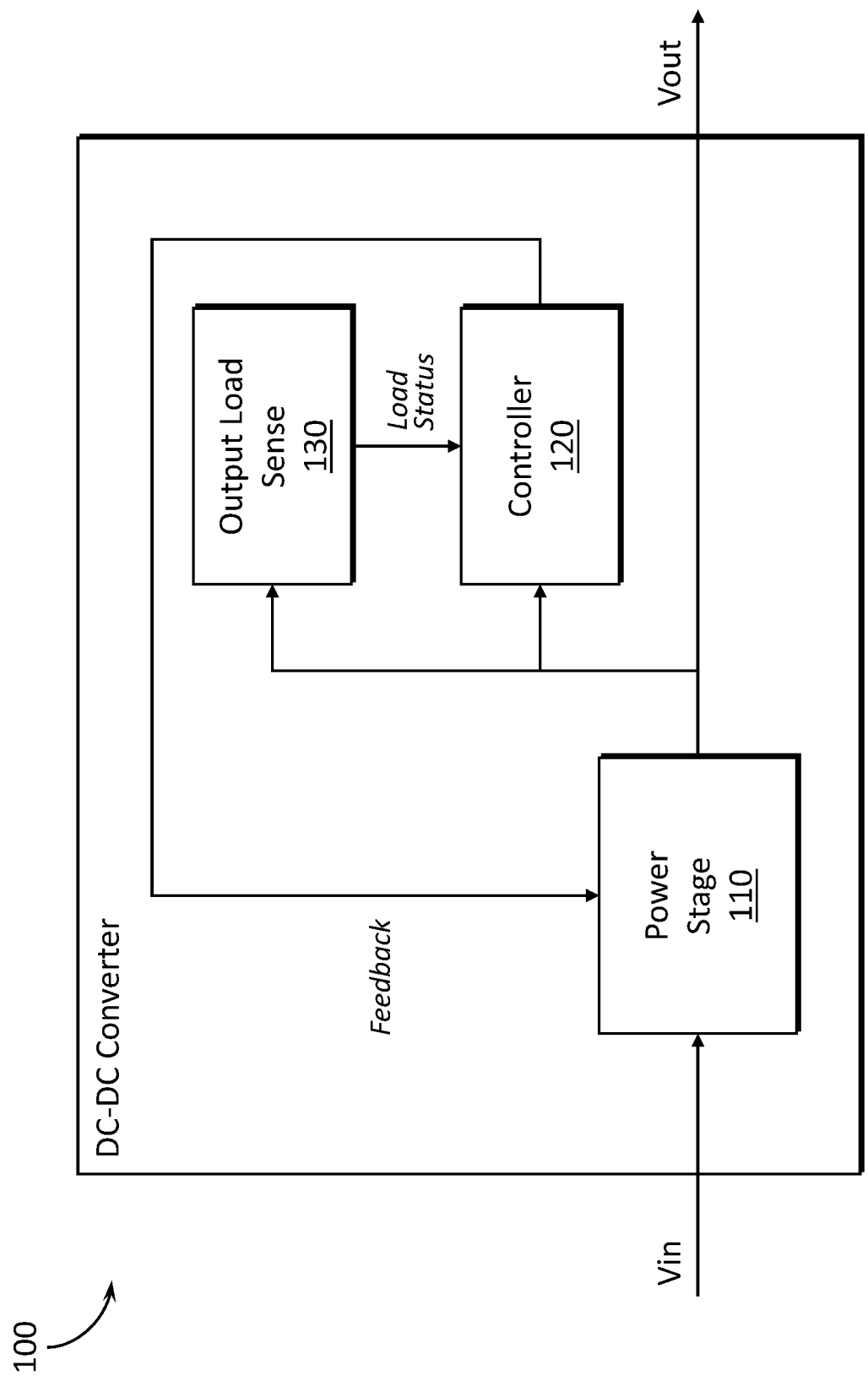
FIG. 1 is a block diagram of an example DC-DC converter, according to an embodiment of the present disclosure.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described with reference to the accompanying drawings. The present examples, however, may be embodied in various different forms and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present invention may not be described.

A DC-DC power converter ("converter") generally receives a first voltage and converts this voltage to a second voltage which is provided as an output voltage. For example, the converter may take a 5V input voltage and provide a 1.5V output voltage. The output of the converter may be coupled to a load, which may include an electronic device such as, for example, a music player, a tablet device, a cell phone, etc., to name a few. The embodiments of the present disclosure contemplate techniques to monitor the output load status (e.g., heavy load, light load, etc.) and regulate the output voltage and the switching frequency of the converter.

FIG. 1 is a block diagram of an example DC-DC converter 100, according to an embodiment of the present disclosure. According to this example, the DC-DC converter 100 includes a power stage module 110, a controller module 120, and an output load sensing module 130. The power stage module 110 receives an input voltage (e.g., 5 VDC) and converts it to another voltage (e.g., 1.5 VDC) which is provided as the output voltage from the converter 100. In various embodiments, the power stage module 110 may be, for example, a boost converter, a buck converter, or a boost-buck converter; however, a person skilled in the art may contemplate other types of power converters that may be implemented for the power stage module 110.

According to various embodiments, the output load sensing module 130 is configured to determine the load status of the converter 100 and provide this status information to the controller module 120, which then provides feedback to the power stage module 110 to regulate the power conversion. In some embodiments, the controller module 120 may be an asynchronous DCM DC-DC converter controller or other controller.

Figure 2:
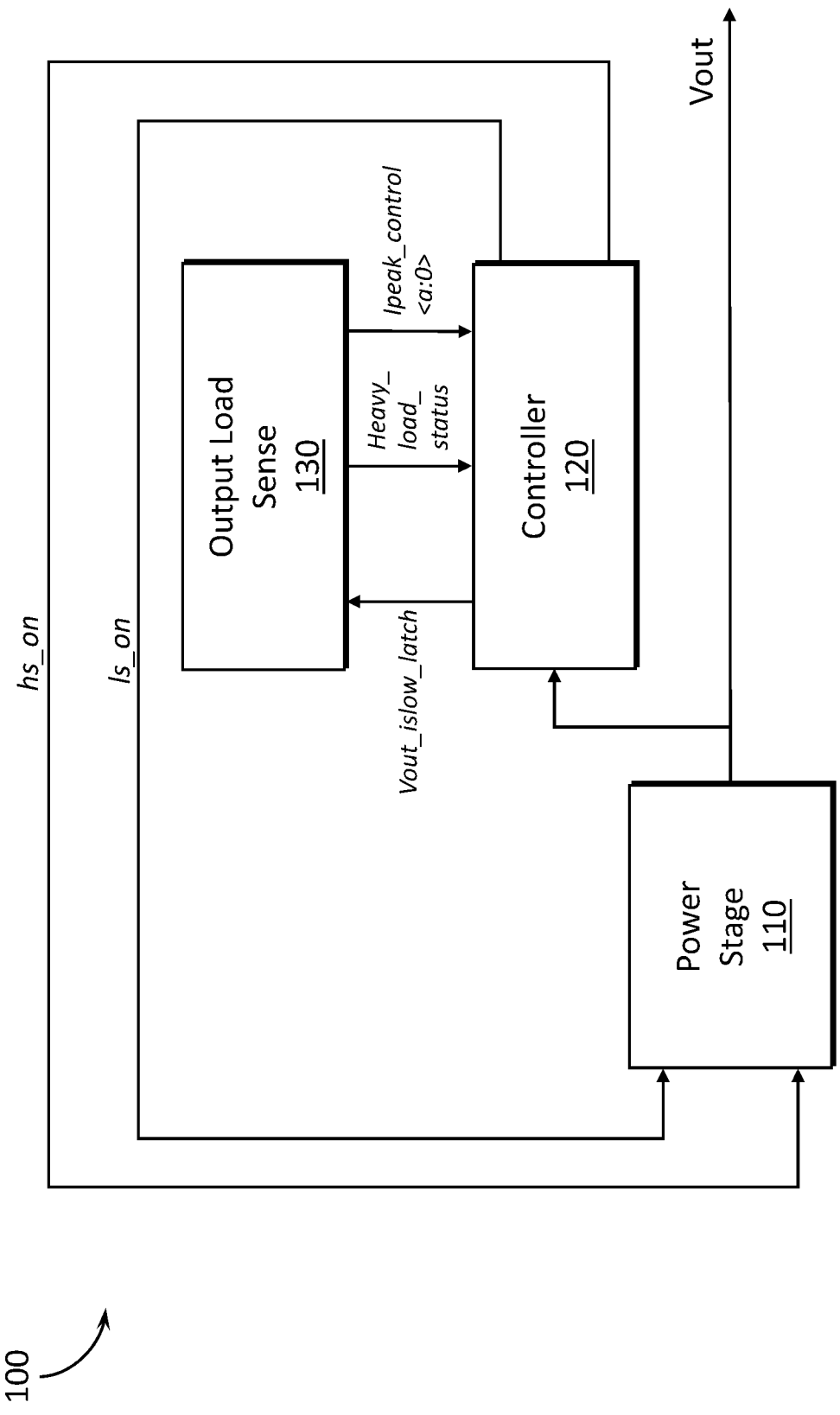
FIG. 2 is a block diagram of an example DC-DC converter illustrating interconnections between the various modules, according to an embodiment of the present disclosure.

An operation of the DC-DC converter 100 of FIG. 1 will now be described in further detail with respect to the block diagram of FIG. 2, which further illustrates interconnections between the various modules, according to an embodiment of the present disclosure. As will be described later in more detail, the output load sensing module 130 is configured to determine the output load status and provide a corresponding value to the controller module 120 via a signal, such as Ipeak_control<a:0>, and based on this, the controller module 120 provides feedback to the power stage module 110 by providing one or more feedback signals (e.g., logic signals hs_on or ls_on) to the power stage module 110. In response, power stage 110 is configured to adjust the peak current of the power stage 110, thus regulating the power conversion.

Figure 3:
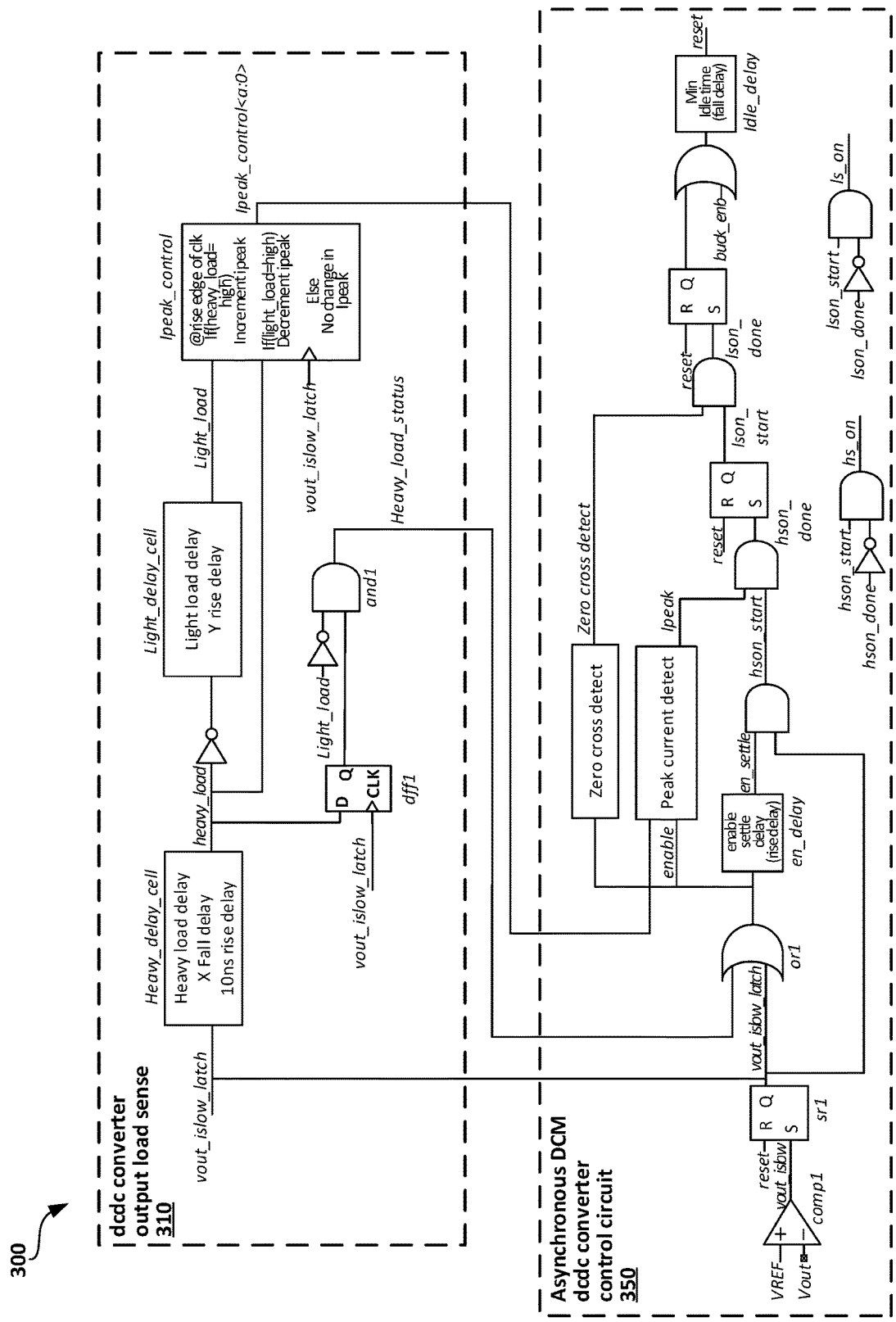
FIG. 3 is an example circuit diagram of a load sensing circuit and controller circuit of a DC-DC converter, according to an embodiment of the present disclosure.

FIG. 3 illustrates an example circuit diagram of a power stage, a load sensing circuit and a controller circuit of a DC-DC converter, according to an embodiment of the present disclosure. A circuit 300 is configured to monitor a DC-DC converter (e.g., DC-DC buck converter) output load status using consecutive timers of a DC-DC converter output load sense circuit 310. A control circuit 350 (e.g., asynchronous DCM DC-DC converter control circuit) is configured to use this output load status information to perform adaptive peak current control such that the converter is able to support a higher output load capacity in heavy output load conditions, a smaller output voltage ripple in light output load conditions, and regulate switching frequency between audio frequency and radio frequency across output loads to reduce interference. In addition, the control circuit 350 is configured to adaptively change power mode to a power save mode in light load status conditions to reduce quiescent current and to a power boost mode in heavy load status to support yet an even higher output load capacity.

Controlling the adaptive peak current supports a higher output load capacity by incrementing the peak current, lower ripples in the output voltage by decrementing the peak current, and by controlling switching frequency by changing the peak current. For example, in audio and wireless applications, the DC-DC converter switching frequency between audio frequency and radio frequency is desirable to reduce interferences. While, pulse density modulation techniques can be used for peak current control, pulse density modulation uses an oscillator (e.g., oscillator frequency≥maximum DC-DC switching frequency), which can be difficult for low-power asynchronous DC-DC converters. Thus, the embodiments of the present disclosure present techniques that perform an adaptive peak current control with two consecutive timers and an asynchronous DC-DC converter control for low quiescent current DC-DC converter applications. In some embodiments, more than two timers may be implemented, for example, three or more timers to further control the adaptive peak current.

In some embodiments in an asynchronous DCM DC-DC converter, a peak current detector and a zero-crossing detector can consume the most quiescent current. Such peak current detector and zero-crossing detector are disabled during light output load conditions (e.g., power save mode) because the quiescent current may be comparable to light output load current. However, when the peak current detector and the zero-crossing detector are disabled, DC-DC control is configured to wait until such detectors are awake for the next switching cycle, and therefore this enable settle delay may degrade the maximum output load capability. In heavy output load conditions, the quiescent current may be negligible to the output load current, and therefore all the peak current detector and the zero-crossing detector are kept enabled to support higher output load capacity (e.g., power boost mode). Accordingly, the described embodiments show adaptive power mode control in asynchronous DCM DC-DC converter by the consecutive timers used in the adaptive peak current control.

FIG. 3 is a circuit diagram of a load sensing circuit 310 and a controller circuit 350 of a DC-DC converter 300, according to an embodiment of the present disclosure. As illustrated, the asynchronous DCM DC-DC converter control 350 initiates a switching cycle when output comparator (comp1) senses that output voltage (vout) is lower than a threshold voltage (VREF), the output comparator (comp1) trips vout_islow signal to a logic high. The vout_islow signal is provided to reset-dominant SR latch (sr1) which latches the vout_islow_latch signal. When vout_islow_latch signal sets to a logic high, an enable signal for detector blocks (i.e., zero cross detect and peak current detect) also trips high when in a light output load condition because heavy_load_status=low.

When the enable signal trips high, DC-DC control 350 waits for the enable settle delay(en_delay) to ensure that the detector blocks are awake before turning on High-side FET (hs_on=high). When High-side FET turns on, the inductor current rises. When the peak current detector senses that the inductor current is higher than a value set by Ipeak_control<a:0>, Ipeak signal trips high, which then turns off High-side FET and turns on Low-side FET (hs_on=low, ls_on=high) thereby causing the inductor current to decrease. When the inductor current is close to zero, zero cross detect trips high and turns off Low-side FET (ls_on=low) and enters an idle mode (both High-side FET and Low-side FET off). After minimum idle delay (idle_delay), the asynchronous DC-DC converter is ready for the next switching cycle when vout is lower than VREF again.

The DC-DC converter output load sense circuit 310 shows two consecutive timers (heavy_delay_cell and light_delay_cell) and a peak current digital control (Ipeak_control). In some embodiments, the peak current digital control (Ipeak_control) may be a 4-bit controller that is configured to output varying level of current at 16 different increments. In other embodiments, the Ipeak_control may be, for example, a 3-bit or a 5-bit controller. At the end of a switching cycle, when the DC-DC converter enters idle mode, vout_islow_latch signal trips to a logic low due to reset-dominant SR latch (sr1) reset=high, and heavy_load_cell starts X fall delay. During X fall delay, heavy_load signal stays high (indicating 'heavy load status'), and after X delay, heavy_load trips to a logic low.

When heavy_load signal trips low, light_load_cell starts Y rise delay. During Y rise delay, both heavy_load and light_load signals are low (indicating load between heavy load and light load status, 'good load status'). After Y rise delay, light_load signal trips to a logic high (indicating 'light load status'). light_load signal and heavy_load signals are sampled by D-flip-flop (dff1) and peak current digital control (Ipeak_control) using the rising edge of the vout_islow_latch signal. If heavy_load=high, light_load=low are sampled, it indicates a 'heavy load status' and the time between the switching cycle is less than X delay. If heavy_load=low, light_load=low are sampled, it indicates a 'good load status' and the time between switching cycle is between X and X+Y. If heavy_load=low, light_load=high are sampled, it indicates 'light_load status' and the time between the switching cycle is longer than Y.

According to an embodiment, with these sampled heavy load and light_load signals, peak current digital control (Ipeak_control) increases the peak current in 'heavy load status' by incrementing Ipeak_control<a:0> code, and decreases the peak current in 'light load status' by decrementing Ipeak_control<a:0> code, and keeps the same peak current in 'good load status'. dff1 samples heavy_load signal to enable power boost mode (heavy_load_status=high). If heavy_load_status=high, enable signals and en_settle signals are kept at a logic high for the next switching cycle by OR gate (or1). Power boost mode (heavy_load_status=high) bypasses the enable settle delay (en_delay) and turns on the High-Side FET as soon as the minimum idle time (idle_delay) expires. In heavy_delay_cell, a 10 ns rise time is added to reduce or avoid false heavy_load=high sample.

When vout_islow_latch signals trips to a logic high, heavy_load signal trips to a logic high after 10 ns. Thus, so if heavy_load signal is a logic low at the rising edge of the vout_islow_latch signal, heavy_load=low is sampled. Also, this 10 ns rise delay keeps the light_load signal high to sample light_load=high. Thus, if light_load signal is high at the rising edge of vout_islow_latch signal, light_load=high is sampled. A 10 ns delay is an arbitrary delay to avoid false heavy_load=high and to sample light_load=high properly. Thus, in some embodiments, the 10 ns delay may be a longer or shorter delay. Yet in other embodiments, the heavy_delay_cell and light_delay_cell can be implemented using resistor-capacitor delay or bias current-capacitor delays to make zero quiescent current.

Figure 4:
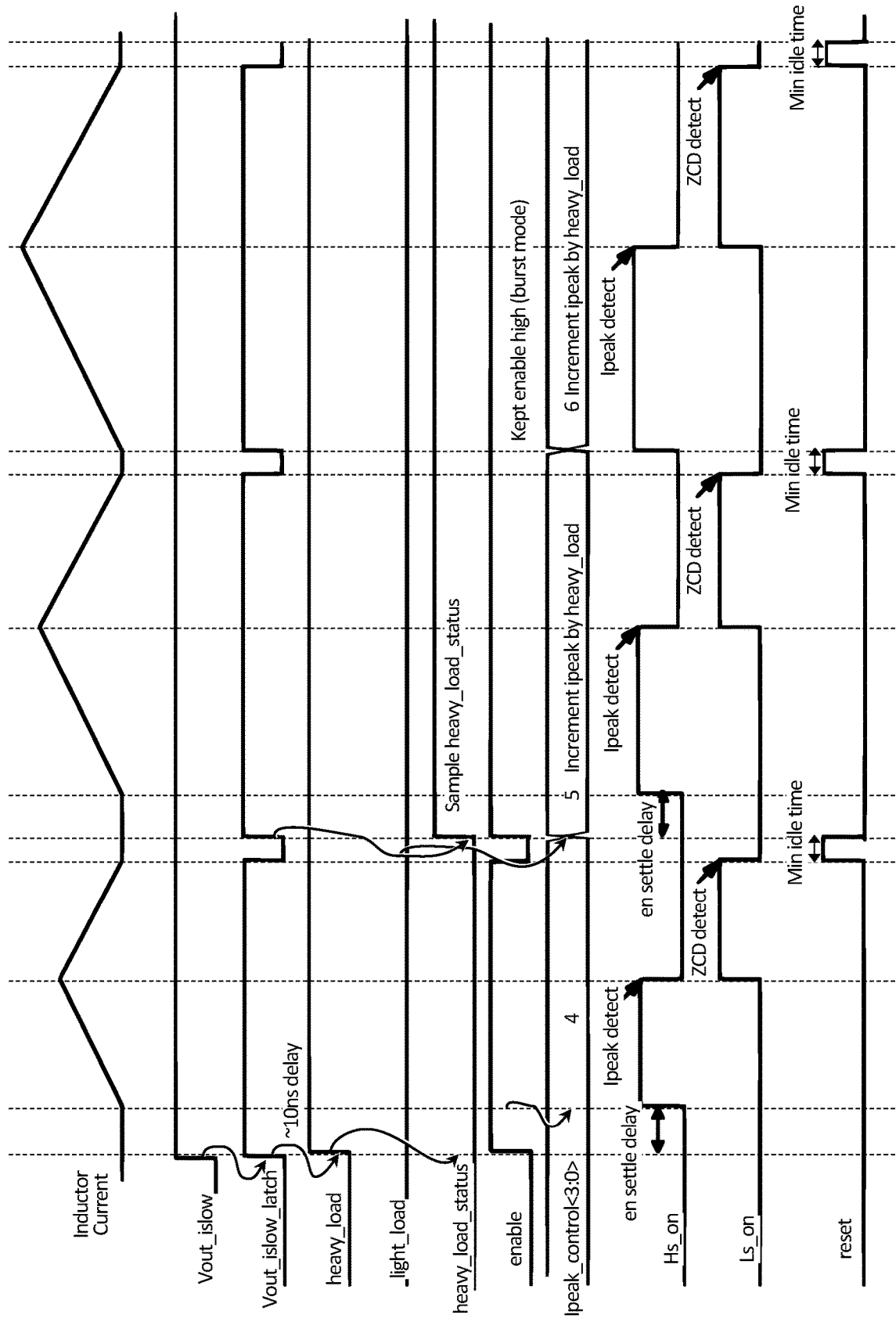
FIG. 4 is an example timing diagram illustrating various waveforms representing DC-DC converter transitions from a good load status to a heavy load status, according to an embodiment of the present disclosure.

FIG. 4 is a timing diagram illustrating various waveforms when the DC-DC converter transitions from a good load status to a heavy load status, according to an embodiment of the present disclosure. As illustrated, both heavy_load and light_load signals are initially low when vout_islow_latch signal trips high, which indicates that the previous switching cycle was a good load status. Because heavy_load=low and light_load=low are sampled by vout_islow_latch signal, Ipeak_control<x:0> keeps the same peak current code, and heavy_load_status signal is low (e.g., power save mode). At the end of the first switching cycle, when zero-crossing detect trips high, the reset signal stays high for the minimum idle time, and trips the vout_islow_latch signal low. When vout_islow_latch signal trips low, heavy_delay_cell starts X fall delay. Before X fall delay passes, a second switching cycle starts with the vout_islow tripping high. Thus, when vout_islow_latch signal trips high, it samples heavy_load=high and light_load=low, which indicates a heavy_load_status. Accordingly, peak current control block increments peak current code Ipeak_control<a:0> from, for example, 4 to 5 to support a higher load capacity and ddf1 samples and sets heavy_load_status=high to enable power boost mode.

Accordingly, because the first switching cycle was a 'good load status', all detector blocks were disabled to save the quiescent current. When vout_islow_latch signal trips high for the second switching cycle, it enables the detector blocks and waits for enable settle delay (en_delay) before turning on High side FET. At the end of the second switching cycle, X fall delay starts, and before X fall delay expires, the third switching cycles starts with the vout_islow_latch signal tripping high. heavy_load=high and light_load=low are sampled (heavy load status') and therefore the peak current control block increments Ipeak_control<a:0> from, for example, 5 to 6 to support an even higher load capacity. Because the previous switching cycle (2$^{nd}$ cycle) was a heavy load (heavy_load_status=high), the detector blocks were kept enable, and therefore the DC-DC asynchronous control bypasses enable settle delay (en_delay) and immediately starts High Side FET turn on (e.g., power boost mode). By incrementing peak current and bypassing enable settle time, the DC-DC converter is able to increase the maximum output load capacity.

Figure 5:
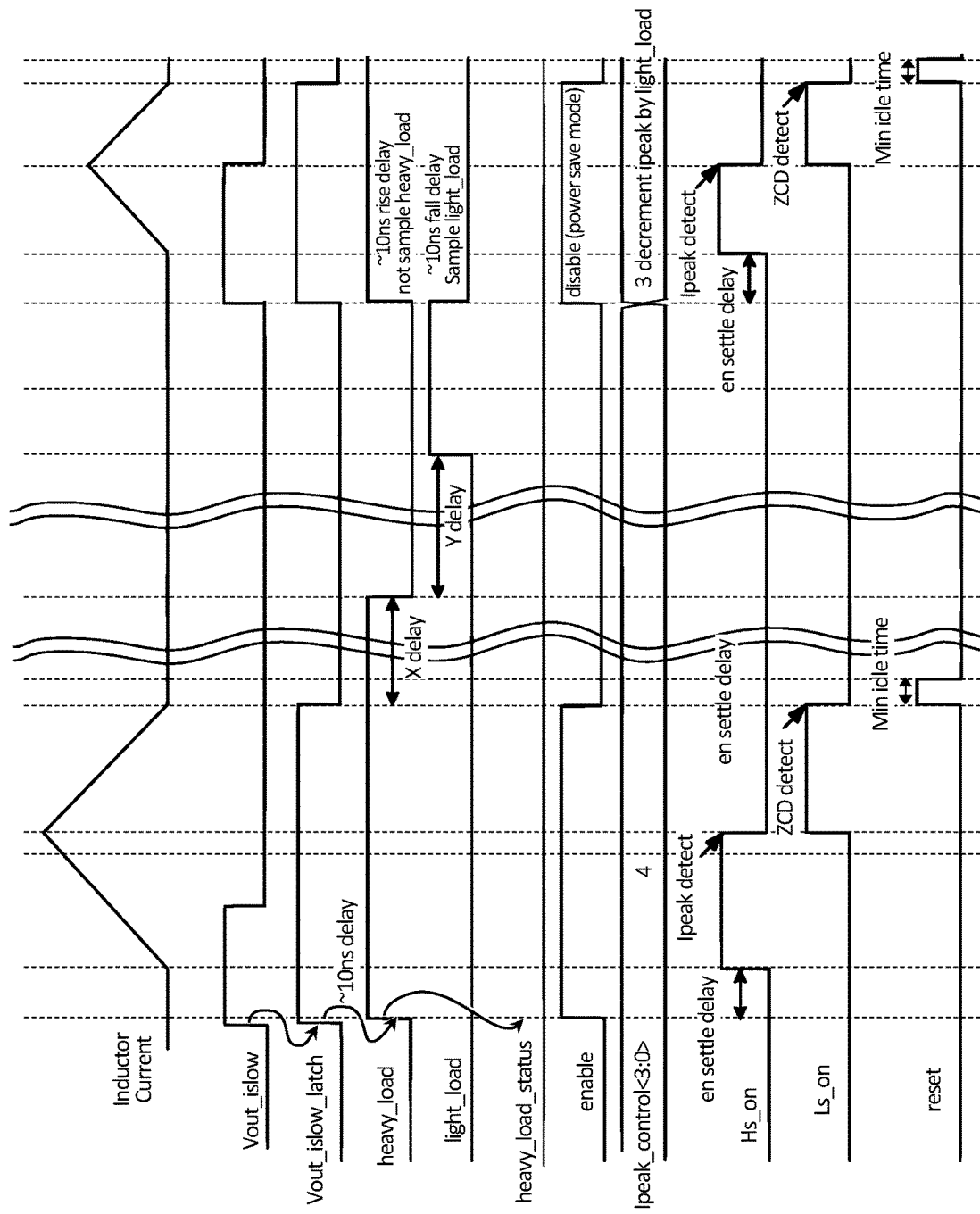
FIG. 5 is an example timing diagram illustrating various waveforms representing DC-DC converter transitions from a good load status to a light load status, according to an embodiment of the present disclosure.

FIG. 5 is a timing diagram illustrating various waveforms when the DC-DC converter transitions from a good load status to a light load status, according to an embodiment of the present disclosure. As illustrated, the DC-DC converter starts with a 'good load status' (e.g., sampled heavy_load=low and light_load=low). At the end of first switching cycle, zero-crossing detect (ZCD) trips high, and vout_islow_latch signal goes low by the reset signal.

In light load condition, vout stays higher than VREF for a longer period of time, and therefore vout_islow and vout_islow_latch signal stay low for a longer time than the X+Y delay. After the X delay, heavy_load signals trips low due to the X fall delay of the heavy_delay_cell, and the Y rise delay of the light dell cell starting. After Y delay, light_load signal trips high (light load status), and when vout_islow_latch signal trips high, light_load=high is sampled. Finally, Ipeak_control<a:0> is decremented for a lower output voltage ripple and higher switching frequency. heavy_load_status also trips low for the power-save mode.

Figure 6:
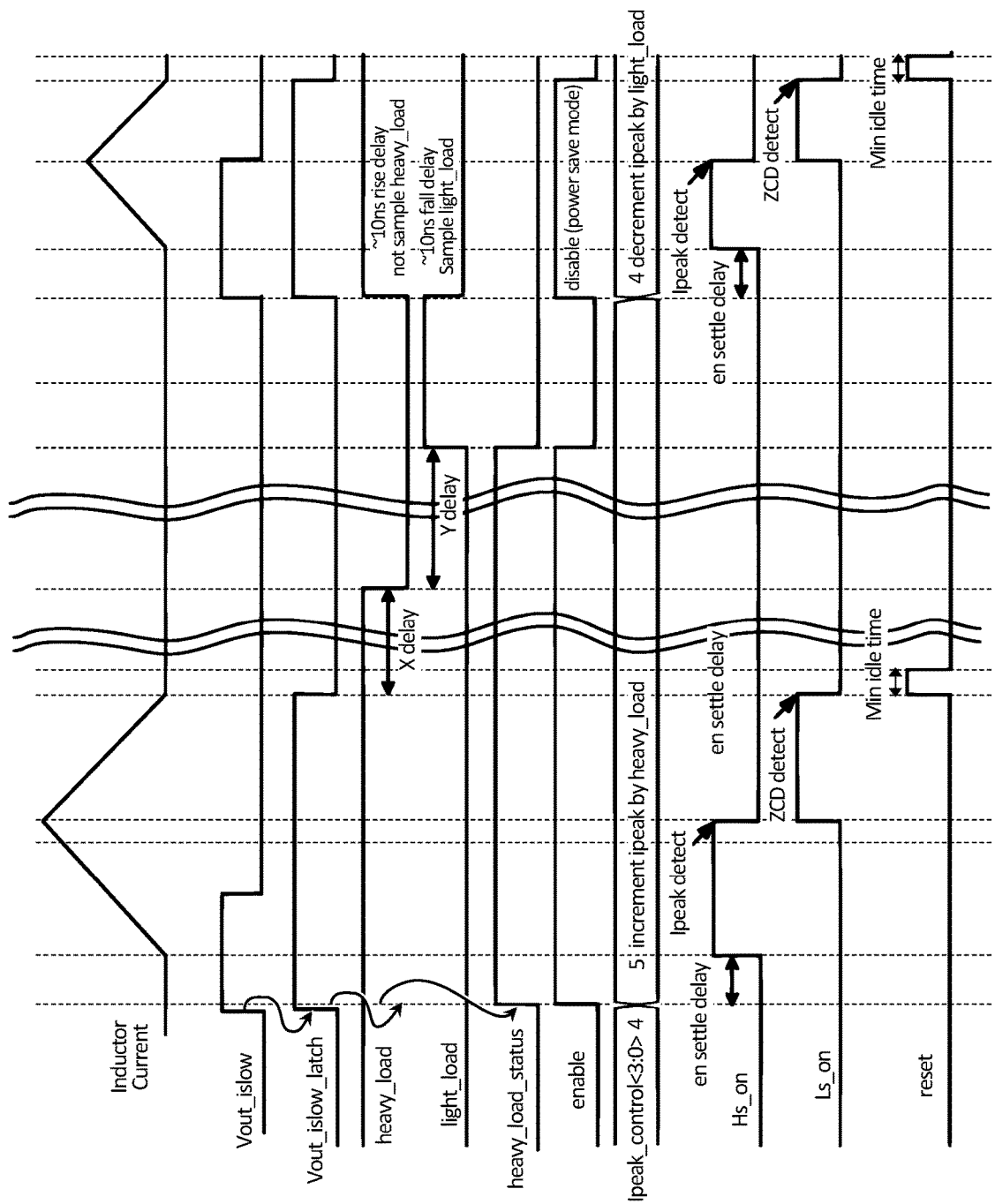
FIG. 6 is an example timing diagram illustrating various waveforms representing DC-DC converter transitions from a heavy load status to a light load status, according to an embodiment of the present disclosure.

FIG. 6 is a timing diagram illustrating various waveforms when the DC-DC converter transitions from a heavy load status to a light load status, according to an embodiment of the present disclosure. As illustrated, heavy_load signal is initially high, so when vout_islow signal trips, heavy_load=high is sampled and sets heavy_load_status high. heavy_load_status high keeps the enable signal high for detector blocks. But after X+Y delay from end of first switching cycle, light_load signal trips high. Inverted light_load signal gates heavy_load_status low by AND gate (and1), so when light_load signal trips high, enable signal goes low to disables detector blocks to enter power save mode.

Figure 7:
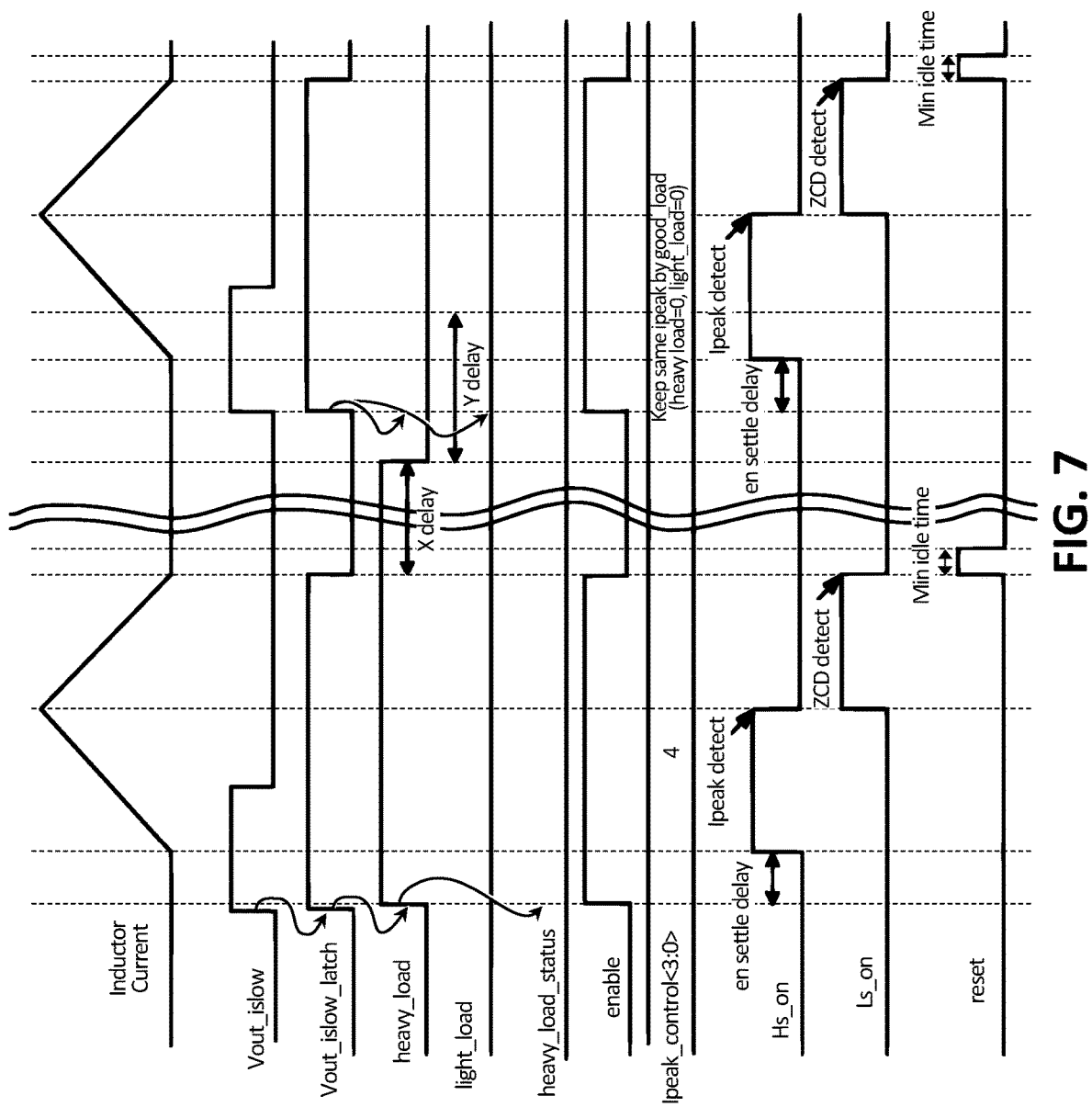
FIG. 7 is an example timing diagram illustrating various waveforms representing DC-DC converter transitions from a good load status to a good load status, according to an embodiment of the present disclosure.

FIG. 7 is a is a timing diagram illustrating various waveforms when the DC-DC converter load is in a steady-state, according to an embodiment of the present disclosure. In steady-state, the switching frequency is already in good load status and remains in the good load status. For example, FIGS. 4-6 illustrates transition scenarios when a load changes abruptly, for example, from a heavy load to light load or vice versa, thus in those scenarios, the peak current is adaptively adjusted to good load status for its new output load value. In this manner, after the abrupt load change, the output load becomes steady-state and the adaptive peak current loop is completed, the DC-DC converter converges into a good load status regardless of the updated output load value. Thus, as illustrated in FIG. 7, the DC-DC converter remains in the good load status (e.g., sampled heavy_load=low and light_load=low) when the load is not changing. Because all switching cycles start during the Y delay, the converted good load status brings the switching period to between X and X+Y when the output load is steady state.

Figure 8:
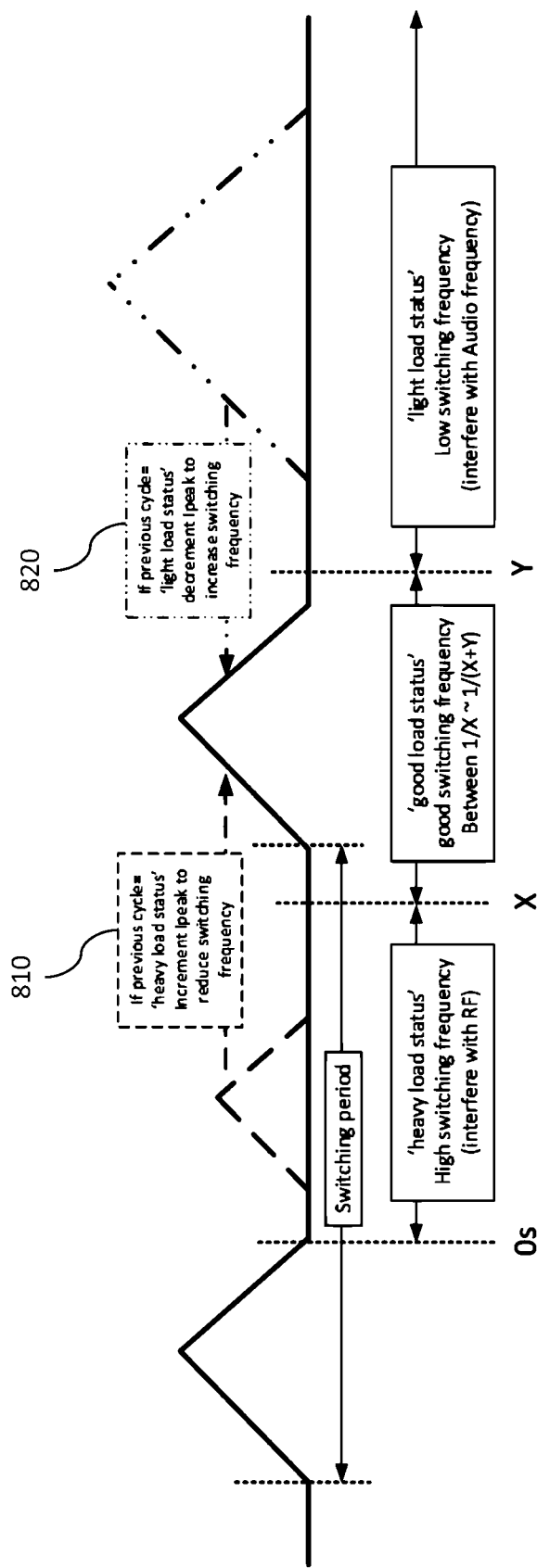
FIG. 8 illustrates example waveforms of an adaptive peak current control for switching frequency regulation, according to an embodiment of the present disclosure.

FIG. 8 illustrates waveforms of an adaptive peak current control for switching frequency regulation, according to an embodiment of the present disclosure. For example, the adaptive peak current control regulates the switching frequency between audio frequency and radio frequency. If the switching frequency is too high and it interferes with the radio frequency (block 810), the peak current may be incremented to push the next cycle to a lower switching frequency, thereby bringing the peak current in to the good switching frequency range. If the switching frequency is too low (block 820) and it interferes with audio frequency, the peak current may be decremented to push the next pulse to a higher switching frequency, thereby bringing the peak current in to the good switching frequency range. With a steady-state output load, the switching frequency may be regulated between 1/X and 1/(X+Y) as shown. Thus, by setting the X delay greater than the radio frequency period (e.g., greater than 415 ns for 2.4 MHz Bluetooth applications) and setting the X+Y delay less than the audio frequency period (e.g., less than 25 us for 40 kHz max audio frequency), the asynchronous DCM DC-DC converter can reduce interferences to audio frequency and radio frequency by pushing, and then maintaining the peak current in the good switching frequency range. In some embodiments, a further Z delay (or additional delays) may be added to further tune and regulate the peak current.

In some embodiments, the described techniques may also be implemented for a synchronous DC-DC converter. However, synchronous DC-DC converters may consume more quiescent current for an oscillator.

Yet in other embodiments, more than two timers may be implemented to check more than three output load statuses. For example, four consecutive timers can check five output load statuses, for example: 1) 'very heavy load status' that increments peak current by 2 LSB; 2) 'heavy load status' that increments peak current by one LSB; 3) 'good load status' that keep the same peak current; 4) 'light load status' that decrements peak current by 1 LSB; and 5) 'very light load status' that decrements peak current by two LSB. Then, the switching frequency may converge to a good switching frequency much faster.

The electronic or electric devices and/or any other relevant devices or components according to embodiments of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A circuit comprising:
   a controller circuit configured to receive a converter output voltage of a converter and adjust a switching frequency of the converter in response to a status of an output load; and
   an output load sensing circuit configured to determine the status of the output load and provide a peak current to the controller circuit, wherein the output load sensing circuit comprises:
      a first delay timer configured to output a first signal indicating whether the output load is a heavy load;
      a second delay timer configured to output a second signal concurrently with the first signal output by the first delay timer, the second signal indicating whether the output load is a light load; and
      a peak current control configured to receive the first and second signals from the first and second timers, respectively, and provide the peak current to the controller circuit based on the received first and second signals.

2. The circuit of claim 1, wherein the peak current control is configured to increment the peak current in response to the output load being a heavy load.

3. The circuit of claim 1, wherein the peak current control is configured to decrement the peak current in response to the output load being a light load.

4. The circuit of claim 1, wherein the peak current control comprises a 4 or more-bit peak current control.

5. The circuit of claim 1, wherein the peak current control is further configured to:
   increment the peak current in response to the first signal indicating that the output load is a heavy load and the second signal concurrently indicating that the output load is not a light load.

6. The circuit of claim 1, wherein the peak current control is further configured to:
   decrement the peak current in response to the second signal indicating that the output load is a light load and the first signal concurrently indicating that the output load is not a heavy load.

7. The circuit of claim 1, wherein the peak current control is further configured to:
   maintain the peak current in response to the first signal indicating that the output load is not a heavy load and the second signal concurrently indicating that the output load is not a light load.

8. The circuit of claim 1, further comprising a power stage, configured to receive an input voltage and convert the input voltage to the converter output voltage different from the input voltage.

9. The circuit of claim 8, wherein the controller circuit further comprises a first latch circuit configured to receive the converter output voltage and provide a latch voltage to the first delay timer of the output load sensing circuit in response to the converter output voltage being greater than a reference voltage.

10. The circuit of claim 9, wherein the controller circuit further comprises a peak current detector configured to receive the peak current from the peak current control of the output load sensing circuit.

11. The circuit of claim 10, wherein the peak current detector is further configured to turn on or turn off a first transistor of the power stage based on the peak current and the converter output voltage being greater than the reference voltage.

12. The circuit of claim 11, wherein the controller circuit further comprises:
a zero-current detector; and
a second latch circuit configured to receive the zero-current detector output and the peak current from the peak current detector to turn on or turn off a second transistor of the power stage.

13. The circuit of claim 12, wherein the first latch circuit and the second latch circuit are reset dominant SR latch circuits.

14. The circuit of claim 8, wherein the power stage is a direct current (DC)-DC converter.

15. The circuit of claim 14, wherein the power stage comprises a buck converter, a booster converter, or a buck-boost converter.

16. A method for adjusting a switching frequency of a direct current (DC)-DC converter, comprising: determining a status of an output load coupled to the DC-DC converter; generating, with a first delay timer, a first signal indicating whether the output load is a heavy load; generating, with a second delay timer, a second signal concurrently with the first signal, wherein the second signal indicating whether the output load is a light load; selectively adjusting a peak current associated with the switching frequency of the DCDC converter based on the first signal and the second signal; and adjusting, with a controller circuit, the switching frequency of the DC-DC converter in response to the peak current.

17. The method of claim 16, wherein the selectively adjusting the peak current comprises:
incrementing the peak current in response to the first signal indicating that the output load is a heavy load and the second signal concurrently indicating that the output load is not a light load.

18. The method of claim 16, wherein the selectively adjusting the peak current comprises:
decrementing the peak current in response to the second signal indicating that the output load is a light load and the first signal concurrently indicating that the output load is not a heavy load.

19. The method of claim 16, wherein the selectively adjusting the peak current comprises:
maintaining the peak current in response to the first signal indicating that the output load is not a heavy load and the second signal concurrently indicating that the output load is not a light load.

20. The method of claim 16, wherein the peak current is associated with the switching frequency between an audio frequency and a radio frequency.

* * * * *